United States Patent [19]

Bederke et al.

[11] Patent Number: 5,391,620
[45] Date of Patent: Feb. 21, 1995

[54] COMPOSITION SUITABLE AS A RHEOLOGY-INFLUENCING AGENT, A METHOD FOR ITS PREPARATION AND ITS USE IN COATING MEDIA

[75] Inventors: Klaus Bederke, Sprockhövel; Ralf Dahm, Wermelskirchen; Hermann Kerber, Wuppertal; Walter Schubert, Wuppertal; Friedrich Hermann, Wuppertal; Heinz-Walter Reifferscheidt, Bochum, all of Germany

[73] Assignee: Herberts Gesellschaft Mit Beschrankter Haftung, Wuppertal, Germany

[21] Appl. No.: 139,918

[22] Filed: Oct. 20, 1993

[30] Foreign Application Priority Data

Oct. 31, 1992 [DE] Germany .............................. 4236901

[51] Int. Cl.⁶ .............................................. C08L 75/00
[52] U.S. Cl. ................................... 525/123; 525/125; 525/131; 528/49
[58] Field of Search ....................... 525/123, 125, 131; 528/49

[56] References Cited

U.S. PATENT DOCUMENTS 5,098,956 3/1992 Blasko et al. ........................ 525/123

Primary Examiner—Maurice J. Welsh
Attorney, Agent, or Firm—Schweitzer Cornman & Gross

[57] ABSTRACT

A rheology-influencing agent for coating media, containing a mixture of a (meth)acrylic copolymer containing hydroxyl groups and/or one or more polyesters containing hydroxyl groups, a hydroxy functional microdispersion obtainable by preparing a solution of one or more film-forming polyesters containing hydroxyl and/or carboxyl groups and/or (meth)acrylic copolymers containing hydroxyl and/or carboxyl groups, the foregoing mixture being reacted with a diisocyanate, and an aliphatic primary monoamine.

15 Claims, 3 Drawing Sheets

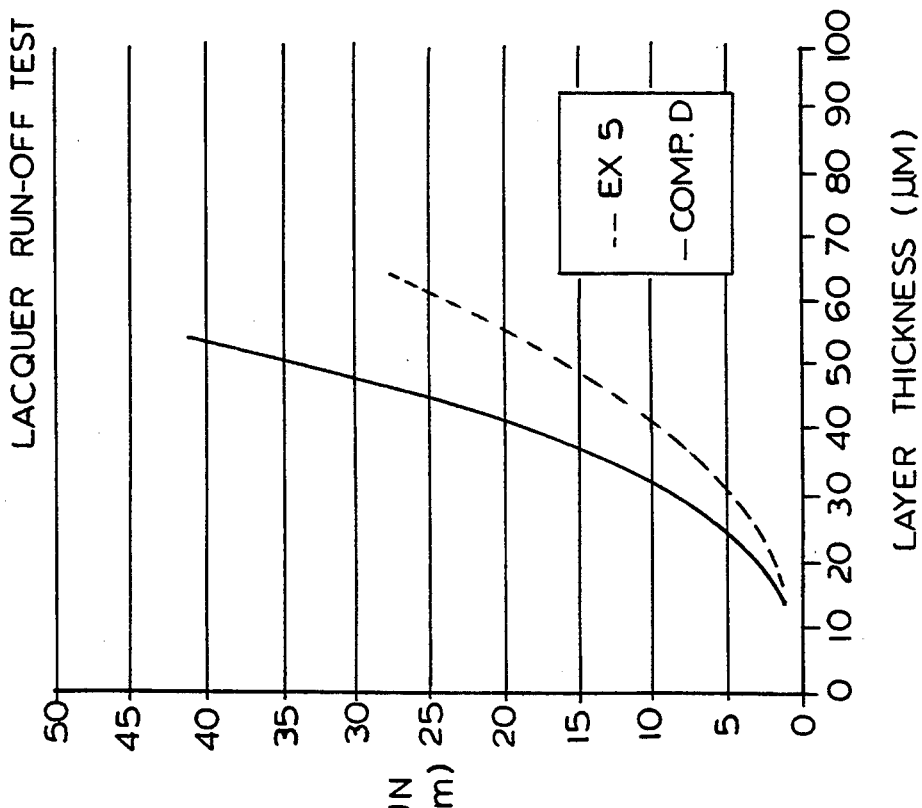
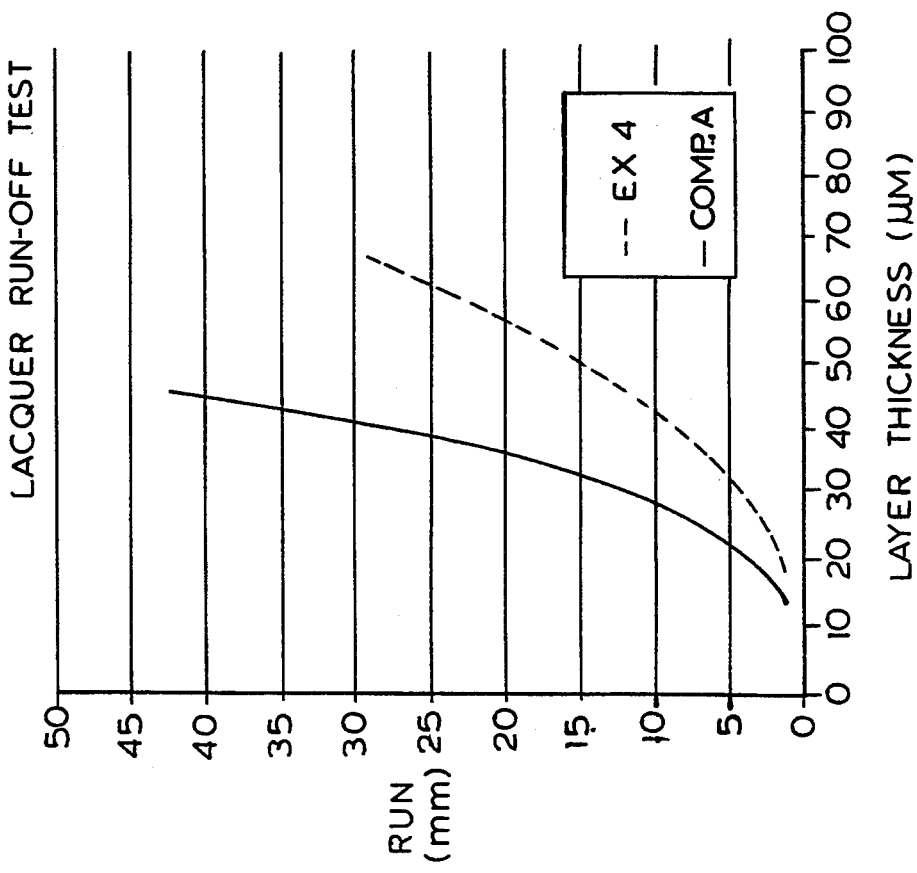

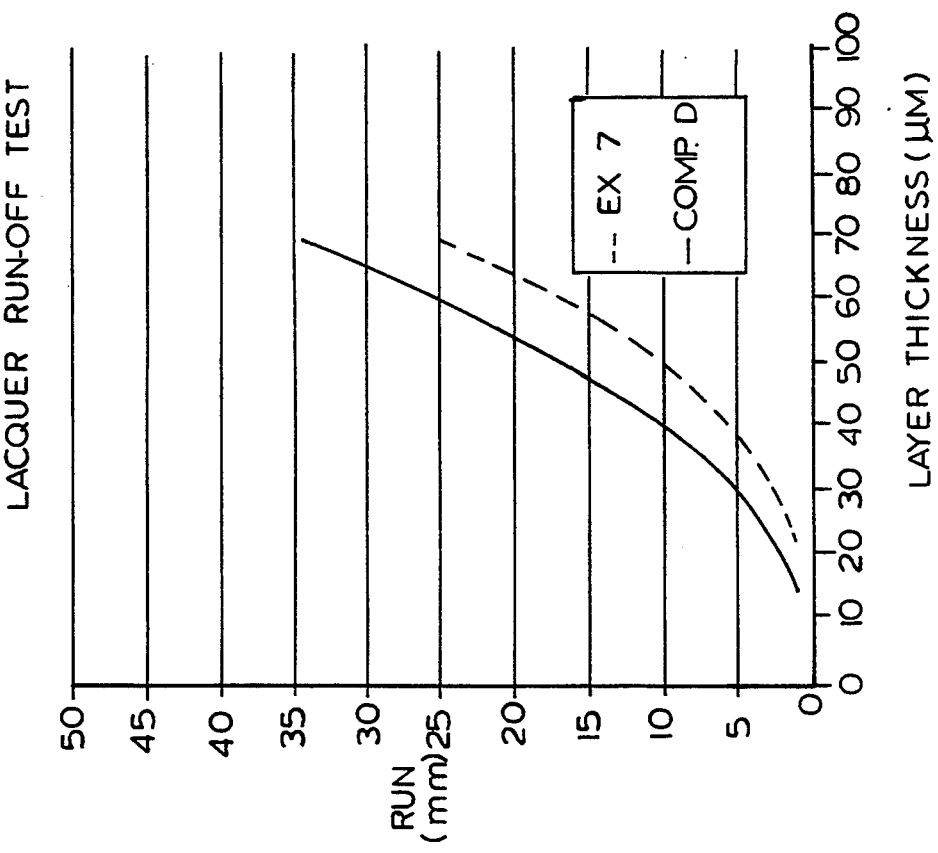
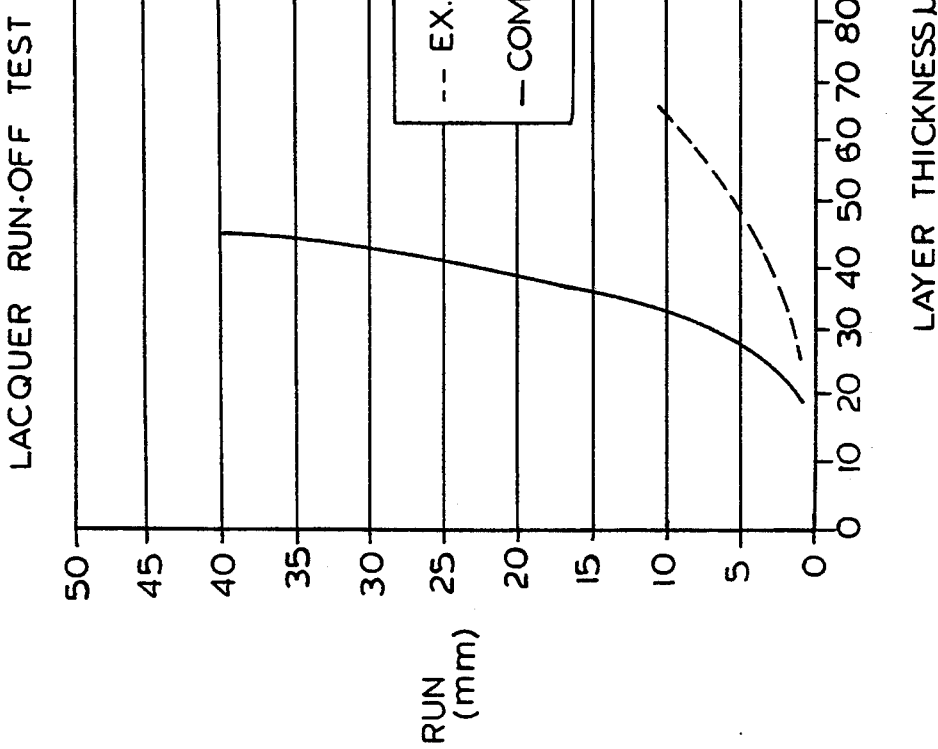

COMPOSITION SUITABLE AS A RHEOLOGY-INFLUENCING AGENT, A METHOD FOR ITS PREPARATION AND ITS USE IN COATING MEDIA

BACKGROUND OF THE INVENTION

This invention relates to a composition which is suitable as a rheology-influencing agent for the production of pigmented and non-pigmented coating media which are resistant to run-off, particularly for stoving systems. The invention also relates to the preparation of the composition and to coating media containing the latter. Requirements and regulations relating to environmental protection and workplace hygiene dictate that the amount of solvents in coating media should be significantly reduced. Development work in this field has been concentrated on raising the solids content of the coating medium (high solids). It has been possible to achieve this object by reducing the molecular weight of the resins. However, after application to vertical areas, to edges and in crevices, and particularly during the stoving operation, coating media of this type exhibit a pronounced run-off tendency ("run formation", "sagging"). Run-off can be impeded by converting a coating medium with quasi-Newtonian flow behaviour into one with plastic or pseudo-plastic flow behaviour.

Thus it is known, for example, that coating materials with a viscous structure can be used where thick film lacquer systems are desired or where low molecular weight, heat-curable lacquers of high solids content are used, which tend to be resistant to run-off. Numerous literature references exist which deal with the resistance to run-off of stoving lacquers, e.g. DE 2360019, DE-A-2359923, DE-A-2359929, DE-A-2751761, EP-A-0 192304 and EP-A-0 198519.

Common to all of these is the formation of a di- or polyurea compound by the reaction of primary, secondary, mono-, di- or polyamines or alcoholamines with mono-, di- or triisocyanates in a carrier resin which is added to the lacquer later.

The run-off stabilising effect of polyurea compounds is based on the formation of hydrogen bridges, the loose network of which stabilises the lacquer film on vertical support surfaces. The network is first destroyed due to shear during the spray application and is formed again (built up) on the substrate after application.

A prerequisite for this effect (resistance to run-off) is the presence of polyureas in particulate form. The particle size, which is produced by means of high stirring speeds using special stirrers and metered addition devices, is important in order to obtain a constant, uniform effect. Simple slow-running stirrer units, such as those which are used in the production of synthetic resins, are unsuitable for this purpose (EP-A-0 192 304). Another disadvantage is that not all the customary lacquer solvents can be used without the resistance to run-off being adversely affected. This applies in particular to polar solvents e.g. monohydric alcohols such as n-butanol (EP-A-0 192304).

One serious disadvantage which occurs on the use of the known polyureas is bloom formation in stoved lacquer films, particularly when run-off preventing agents are used in clear lacquers. Smooth film surfaces are frequently not obtained; instead surfaces are obtained with pinholes or with a microstructure, or matt surfaces are obtained. The result of this is reduced gloss and reduced brilliance.

SUMMARY OF THE PRESENT INVENTION

Accordingly, the object of the present invention is to produce coating media which exhibit a high resistance to run-off and which nevertheless result in smooth, perfect surfaces.

It has been shown that this object can be achieved by the preparation of coating media which contain a rheology-influencing agent which is not based on the known di- or polyurea compounds but instead is based on monourea compounds which are fixed on a strongly hydroxyfunctional acrylic dispersion, which was previously produced in an acrylic or polyester resin.

DETAILED DESCRIPTION OF THE INVENTION

Accordingly, the present invention relates to coating media which contain a composition suitable as a rheology-influencing agent, the invention also relating to the latter composition. The composition according to the invention which is suitable as a rheology-influencing agent for coating media is designated below as a "rheology-influencing agent". The rheology-influencing agent according to the invention contains a mixture which is obtainable by preparing a mixture of A) one or more (meth)acrylic copolymers containing hydroxyl groups and/or one or more polyesters containing hydroxyl groups, with a hydroxyl number of 30–200 mg KOH/g and a carboxyl group content corresponding to an acid number of 0–50 mg KOH/g, and B) a hydroxyfunctional microdispersion obtainable by preparing a solution of one or more film-forming polyesters containing hydroxyl and/or carboxyl groups and/or (meth)acrylic copolymers containing hydroxyl and/or carboxyl groups, wherein up to half of the polyester and/or (meth)acrylic copolymer molecules can each be esterified with one molecule of maleic acid or maleic anhydride, and the polymerisation of one or more polymerisable monomers based on one or more hydroxyalkyl (meth)acrylates which may be present in the mixture with one or more other unsaturated monomers in this preparation, and reaction of the mixture of A) and B) with C) one or more diisocyanates and D) one or more aliphatic primary monoamines which may be present in the mixture with part of component A) or of the soluble fraction of component B), wherein the amount of (meth)acrylic copolymers and/or polyesters contained in components A), B) and D) is 57 to 90 weight %, the amount of microparticles contained in B) is 5 to 30 weight %, the amount of diisocyanates C) is 3 to 8 weight %, and the amount of monoamines D) is 2 to 5 weight %, wherein the weight percentages are in each case based on the solids content and add up to 100 weight %, and the composition may in addition contain pigments, extenders, the usual lacquer additives and/or solvents.

Component B) comprises a microdispersion of solid microparticles in a soluble fraction which optionally contains solvent. The proportion of solid particles may be determined in an ultracentrifuge, for example.

According to a preferred embodiment, component B is obtainable by preparing a solution of a) 15–85 weight % of one or more film-forming polyesters containing hydroxyl and/or carboxyl groups and/or (meth)acrylic copolymers containing hydroxyl and/or carboxyl groups, wherein up to half of the polyester and/or (meth)acrylic copolymer molecules can each be esterified with one molecule of maleic acid, and the polymerisation in this preparation of b) 15–85 weight % of one or more radically polymerisable monomers based on one or more hydroxyalkyl (meth)acrylates and one or more other unsaturated monomers.

According to another preferred embodiment, the radically polymerisable monomers of component B) are a mixture of b1) 80–100 weight % of one or more hydroxyalkyl (meth)acrylates and b2) 0–20 weight % of one or more other unsaturated monomers.

The expression "(meth)acrylic" which is used here means acrylic and/or methacrylic.

The preparation of the (meth)acrylic copolymer, components A) and a), which is contained in the rheology-influencing agent according to the invention, may be effected by polymerisation by the usual methods, e.g. solventless polymerisation, solution polymerisation or pearl polymerisation. These various polymerisation methods are well known and are described in: Houben-Weyl, Methoden der Organischen Chemie, Fourth Edition, Volume 14/1, pages 24–255 (1961).

The solution polymerisation method is preferred for the preparation of the (meth)acrylic copolymer used in the rheology-influencing agents according to the invention. In this method the solvent is introduced into the reaction vessel, heated to its boiling point, and the monomer/initiator mixture is added continuously over a given period. The polymerisation is carried out at temperatures between 60° C. and 160° C., for example, preferably at 80° C. to 140° C.

The polymerisation reaction is started using known polymerisation initiators. Suitable initiators comprise per- and azo- compounds which thermally decompose into radicals in a first-order reaction. The type and amount of initiator are selected so that the supply of radicals at the polymerisation temperature is as constant as possible during the admission phase.

Examples of initiators which are preferably used for the polymerisation include: dialkyl peroxides such as di-tert.-butyl peroxide, di-cumyl peroxide; diacyl peroxides such as di-benzoyl peroxide, di-lauroyl peroxide; hydroperoxides such as cumene hydroperoxide, tert.-butyl hydroperoxide; peresters such as tert.-butyl perbenzoate, tert.-butyl perpivalate, tert.-butyl per-3,5,5-trimethylhexanoate, tert.-butyl per-2-ethylhexanoate; peroxydicarbonates such as di-2-ethylhexyl peroxydicarbonate, dicyclohexyl peroxydicarbonate; perketals such as 1,1-bis-(tert.-butyl-peroxy)-3,5,5-trimethylcyclohexane, 1,1-bis-(tert.-butylperoxy) cyclohexane; ketone peroxides such as cyclohexanone peroxide, methyl isobutyl ketone peroxide; azo compounds such as 2,2'-azo-bis(2,4-dimethylvaleronitrile)-2,2'-azo-bis(2-methyl butyronitrile), 1,1'-azo-bis-cyclohexane carbonitrile, azo-bis-isobutyronitrile.

The polymerisation initiators, particularly peresters, are preferably used in an amount of 0.2 to 8 weight % of the monomers weighed in.

Examples of suitable organic solvents which are advantageously used in the solution polymerisation and subsequently also in the rheology-influencing agent and coating media according to the invention include: glycol ethers such as ethylene glycol dimethyl ether; glycol ether esters such as ethyl glycol acetate, butyl glycol acetate, 3-methoxy-n-butyl acetate, butyl diglycol acetate, methoxypropyl acetate; esters such as butyl acetate, isobutyl acetate, amyl acetate; ketones such as methyl ethyl ketone, methyl isobutyl ketone, diisobutyl ketone, cyclohexanone, isophorone; alcohols such as methanol, ethanol, n-propanol, iso-propanol, n-butanol, iso-butanol, sec.-butanol, tert.-butanol, hexanol, 2-ethylhexanol Aromatic hydrocarbons such as xylene, Solvesso 100 (Registered Trade Mark); and aliphatic hydrocarbons can also be used in admixture with the above-mentioned solvents. Aprotic solvents are preferred.

Chain transfer agents may additionally be used in the preferred solution polymerisation to control the molecular weight. Examples of these include mercaptans, thioglycollic acid esters, chlorinated hydrocarbons, cumene, dimeric α-methyl styrene, and 3-oxa-tetrahydrofurane.

The polymerisation conditions (reaction temperature, period of addition of the monomer mixture, solution concentration) are adjusted so that the (meth)acrylic copolymers for the rheology-influencing agent produced according to the invention have a number average molecular weight (determined by gel permeation chromatography using polystyrene as the calibration material) between 1500 and 30,000.

The (meth)acrylic copolymers (components A) and a) of the rheology-influencing agent produced according to the invention preferably have a glass transition temperature range of $-20°$ C. to $+80°$ C., calculated from the glass transition temperature of the homopolymers of the individual monomers given in the literature (FOX comparison, see polymere Werkstoffe [*Polymeric Materials*], Batzer, 1985, page 307, for example).

Alkyl esters of acrylic acid and/or methacrylic acid are used, in addition to hydroxyalkyl esters of acrylic acid and/or methacrylic acid and optionally in addition to other α,β-unsaturated monomers and/or optionally acrylic acid and/or methacrylic acid, as the monomer components for the preparation of the (meth)acrylic copolymer containing hydroxyl groups (component A; a).

Examples of alkyl esters of acrylic acid and methacrylic acid include: methyl acrylate, methyl methacrylate, ethyl acrylate, ethyl methacrylate, iso-propyl methacrylate, tert.-butyl acrylate, tert.-butyl methacrylate, n-butyl acrylate, n-butyl methacrylate, iso-butyl acrylate, iso-butyl methacrylate, cyclohexyl methacrylate, trimethyl cyclohexyl methacrylate, 2-ethylhexyl acrylate, 2-ethylhexyl methacrylate, lauryl acrylate, lauryl methacrylate, stearyl acrylate, stearyl methacrylate, isobornyl acrylate, and isobornyl methacrylate.

Examples of hydroxyalkyl esters of acrylic acid or methacrylic acid include: β-hydroxyethyl acrylate, β-hydroxyethyl methacrylate, β-hydroxypropyl acrylate, β-hydroxypropyl methacrylate, 1,4-butanediol monoacrylate, 1,4-butanediol monomethacrylate, 1,6-hexanediol monoacrylate and 1,6-hexanediol monomethacrylate. Hydroxyalkyl esters of this type are also suitable as component b1. In addition, the reaction products of one mole of hydroxyalkyl (meth)acrylate with caprolactone may be used, as may the reaction products of (meth)acrylic acid with glycidyl esters of aliphatic α, α'disubstituted monocarboxylic acids.

Examples of comonomers which may also be used with the above-mentioned acrylic acid esters, methacrylic acid alkoxy esters and hydroxyalkyl esters include styrene and styrene derivatives, and vinyl esters, such as vinyl acetate, vinyl propionate or vinyl versatate, for example. $\alpha,\beta$-unsaturated monomers of this type may optionally be used at up to 50 weight % based on the total weight of monomers.

To provide the (meth)acrylic copolymer with carboxyl groups, (meth)acrylic acid or the reaction products of hydroxyalkyl (meth)acrylates with dicarboxylic acid anhydrides may be polymerised in, in amounts such that an acid number of 0 to 50 mg KOH/g, from 1 to 50 mg KOH/g for example, preferably 5 to 30 mg KOH/g, results.

The polyesters used as component A) constitute polycondensation products of polyvalent polycarboxylic acids or their anhydrides and polyhydric polyols, possibly with the use of monocarboxylic acids. Polyesters of this type are preferably prepared with an excess of alcohol. The OH numbers are 30 to 200, preferably 60 to 160 mg KOH/g, and the acid numbers are 0 to 50 mg KOH/g. However, the procedure employed for the preparation of the polyesters may be such that the latter contain free carboxyl groups corresponding to an acid number of 1 to 50, preferably 5 to 30. This may be achieved, for example, by incomplete esterification, or by using monomers containing hydroxyl groups, e.g. dihydroxycarboxylic acids such as dimethylolpropionic acid, or tricarboxylic acids. The number average molecular weights are 1000 to 6000, preferably 1000 to 3000 g/mole.

Examples of suitable polycarboxylic acids include o-phthalic acid (anhydride), isophthalic acid, terephthalic acid, tetrahydrophthalic acid, hexahydrophthalic acid, cyclohexane 1,2-dicarboxylic acid, cyclohexane 1,3-dicarboxylic acid, cyclohexane 1,4-dicarboxylic acid, 4-methyl hexahydrophthalic acid, endomethylene tetrahydrophthalic acid, succinic acid (anhydride), glutaric acid, adipic acid, azelaic acid, sebacic acid, dodecane diacids and dimeric fatty acids.

The polyesters may also contain small proportions of maleic acid or maleic anhydride. Natural and synthetic monocarboxylic acids may also optionally be used together with the above-mentioned polycarboxylic acids, such as benzoic acid, tert.-butyl benzoic acid, lauric acid, isononanoic acid and fatty acids from naturally occurring oils, for example.

Examples of suitable alcohol components for the preparation of the polyesters include ethylene glycol, diethylene glycol, triethylene glycol, polyethylene glycols, propanediols, polypropylene glycols, butanediols, hexanediols, neopentyl glycol, cyclohexane diol, cyclohexanedimethanol, trimethyl pentanediol, ethyl butyl propanediol, trimethylolethane, trimethylolpropane, ditrimethylolpropane, glycerine, pentaerythritol, dipentaerythritol and tris-hydroxyethyl isocyanurate.

The polyesters may contain glycidyl esters of $\alpha, \alpha'$-disubstituted monocarboxylic acids and $\epsilon$-caprolactams as modifying components.

The dispersions according to the invention may be prepared, for example, by the formation of a dispersed phase of uncrosslinked (meth)acrylic copolymers (component b) in a dissolved film-forming polyester containing hydroxyl and/or carboxyl groups and/or a (meth)acrylic copolymer containing hydroxyl and/or carboxyl groups as the preparation (component a)).

Examples of polyesters suitable as component a) include esterification products of aliphatic and/or cycloaliphatic polyols, and aliphatic, cycloaliphatic and/or aromatic polycarboxylic acids with are customary for industrial coating purposes.

The polyesters which are used for the preparation of the dispersions containing hydroxyl groups may have a hydroxyl number of about 30 to 200 for example, preferably 60 to 160, and an acid number of about 1 to 50 for example, preferably 5 to 30.

The number average molecular weight ($M_n$) is advantageously about 1000 to 6000, preferably 1000 to 3000. The (meth)acrylic copolymers containing hydroxyl and carboxyl groups which can be used as component b) advantageously have a number average molecular weight ($M_n$) of about 1500 to 30,000. The hydroxyl number is advantageously 30 to 200, for example, and the acid number is 1 to 50, for example. These comprise the customary copolymers for coating purposes, which are obtainable for example by the radical copolymerisation of $\alpha,\beta$-olefinically unsaturated monomers with acrylic acid, methacrylate acid and their derivatives, such as esters with aliphatic $C_1$-$C_{18}$ alcohols. Examples of $\alpha,\beta$-unsaturated monomers are those which are cited below for component B).

Up to half the molecule (i.e. up to 50% based on the number average molecular weight) of both the polyester and of the (meth)acrylic copolymer of component a) may he esterified in each case with one molecule of maleic acid or maleic anhydride. Esterification with maleic acid is preferably effected when the number average molecular weight ($M_n$) of the polyester or (meth)acrylic matrix is within the lower range cited, i.e. within the range from 1500 to 30,000 for the (meth)acrylic copolymers. In this respect, up to 50% of the molecules are preferably in the form of the maleic acid ester. The maleic acid half-esters which are present are preferably obtained, for example, by reacting the polyester or (meth)acrylic copolymer containing hydroxyl groups with an amount of maleic acid such that only a maximum of half the molecule can react.

Hydroxyalkyl esters of acrylic acid and methacrylic acid are the major constituents of the dispersed phase (component b).

The dispersion containing hydroxyl groups which is used according to the invention is prepared by radical polymerisation.

The vehicle matrix containing hydroxyl groups and carboxyl groups (polyester and/or (meth)acrylic copolymer) is introduced into the reaction vessel in solvated (dissolved) form, heated to the reaction temperature, and the monomer/initiator mixture is continuously added to the dispersed phase over 2 to 8 hours for example, preferably over 2 to 6 hours.

In the case of half-ester formation with maleic acid, the corresponding amount of maleic acid is added and esterification is effected by heating to 100° to 120° C., for example, before the addition of the monomer/initiator mixture.

The polymerisation is conducted, for example, at temperatures between 60° C. and 160° C. preferably at 100° C. to 130° C.

The preparation of component B) is effected in a solution of component a) in an organic solvent, preferably in an aprotic solvent. The solvents used for the dissolution or solvation of the vehicle matrix (component a), for example, may be those which will also be used later for the coating media produced from the rheology-influencing agents according to the invention. These comprise the usual organic solvents, for example glycol ethers such as ethylene glycol dimethyl ether; glycol ether esters such as ethyl glycol acetate, butyl glycol acetate, 3-methoxy-n-butyl acetate, butyl diglycol acetate, ethoxypropyl acetate, methoxypropyl acetate; esters such as methyl acetate, ethyl acetate, butyl acetate, isobutyl acetate, amyl acetate; ketones such as methyl ethyl ketone, methyl isobutyl ketone, diisobutyl ketone, cyclohexanone, isophorone; aromatic hydrocarbons such as toluene, o-, m- and p-xylene, ethyl benzene, SOLVESSO 100° (a mixture of aromatic hydrocarbons with a boiling range of 153°–180° C.). Alcohols such as methanol, ethanol, n-propanol, isopropanol, n-butanol, iso-butanol, sec.-butanol, tert.-butanol, hexanol, 2-ethylhexanone, and aliphatic hydrocarbons such as heptane, white spirit (petroleum spirit with a boiling range of 144°–165° C.) may also be used proportionally with the above-mentioned solvents.

Chain transfer agents may be used in addition during the preparation of component B) in the prepared component a), to control the molecular weight. The usual chain transfer agents, for example mercaptans, thioglycollic acid esters and chlorinated hydrocarbons, etc., are suitable.

The polymerisation conditions (reaction temperature, period of addition of the monomer mixture, type and amount of initiator, solution concentration, solvent composition) are selected so that trouble-free formation of the polymer microparticles occurs.

The particle size of the dispersed phase, measured by photon correlation spectroscopy, is preferably in the range from 50 to 800 nm, most preferably from 200 to 500 nm.

The dispersed phase of the non-aqueous dispersion containing hydroxyl groups prepared according to the invention preferably has a glass transition temperature range from −40° C. to +60° C., calculated from the glass transition temperature of the homopolymer of the individual monomers given in the literature (FOX comparison).

Aromatic diisocyanates are preferably used for the preparation of the rheology-influencing agent. Examples of suitable diisocyanates include: toluene 2,4- and 2,6-diisocyanates and their mixtures, diphenylmethane 4,4'-diisocyanate, m-phenylene diisocyanate, p-phenylene diisocyanate, diphenyl 4,4'-diisocyanate, naphthalene 1,5-diisocyanate, toluidine 4,4'-diisocyanate and xylylene diisocyanate. Toluene 2,4- and 2,6-diisocyanates and their mixtures are preferably used.

N-butyl-, n-hexyl-, n-octyl-, n-decyl-, n-dodecyl- and n-stearylamine are used for the reaction of the aromatic diisocyanate with aliphatic primary monoamines to form disubstituted ureas. N-octylamine and n-decylamine are preferably used.

The rheology-influencing agent is prepared, for example, in reaction vessels which can be heated and cooled and which are equipped with a stirring mechanism, thermometer and reflux condenser, with the introduction of one or more dissolved (meth)acrylic copolymers containing hydroxyl groups and/or one or more polyesters containing hydroxyl groups, and a micro-dispersion with a high content of hydroxyfunctional groups, and the addition of an aromatic diisocyanate at temperatures of 20° to 40° C., preferably 30° C. The reaction of the NCO groups with the hydroxyl groups of the vehicle matrix is continued until about 50% of the NCO groups which were originally available have reacted, as measured by the NCO number of the reaction mixture. Thereafter, a mixture of an aliphatic primary monoamine and a vehicle containing hydroxyl groups is added continuously over a period of 2 to 5 hours, preferably 3 hours. The subsequent reaction is then allowed to proceed for about 2 hours and the mixture is thinned to the desired processing concentration using the usual lacquer solvents. The solvents may comprise those which were described for the preparation of components A) and B), for example, including aprotic solvents.

The rheology-influencing agents according to the invention may be used together with the usual vehicles containing hydroxyl groups for the production of the coating media according to the invention. Examples of vehicles containing hydroxyl groups which can be used include the usual film-formers, for example those based on (meth)acrylic copolymers containing hydroxyl groups, polyesters containing hydroxyl groups, polyurethanes containing hydroxyl groups or epoxy resins containing hydroxyl groups which are familiar to one skilled in the art. The same (meth)acrylic copolymers containing hydroxyl groups and the same polyesters containing hydroxyl groups which are used for component A) of the rheology-influencing agent according to the invention may be also used as vehicles. The coating media may be formulated in the usual manner with crosslinking agents such as aminoplast resins, polyisocyanates or perpolyisocyanates.

Suitable aminoplast resins comprise alkylated condensation products prepared by the reaction of aminotriazines and amidotriazines with aldehydes. Compounds containing amino or amido groups, such as melamine, benzoguanamine, dicyandiamide, urea or N,N'-ethylene carbamide, are condensed with aldehydes, particularly formaldehyde, in the presence of alcohols, such as methyl, ethyl, propyl, isobutyl, n-butyl and hexyl alcohols according to known industrial procedures. The reactivity of amine resins of this type is determined by the degree of condensation, the ratio of amine or amide component to formaldehyde, and by the type of etherification alcohol used. The quantitative ratio of the aminoplast resin used to the remaining proportion of vehicle (including the rheology-influencing agent) is 20:80 to 40:60 (calculated as solid to solid).

The proportion of polyisocyanate crosslinking agent is preferably selected so that 0.5 to 1.5 isocyanate groups are allotted to one hydroxyl group of the vehicle component. Excess isocyanate groups may be reacted with moisture and contribute to the crosslinking. Aliphatic, cycloaliphatic and aromatic polyisocyanates may be used, such as hexamethylene diisocyanate, trimethyl hexamethylene diisocyanate, isophorone diisocyanate, 4,4'-diisocyanato-dicyclohexylmethane, toluene 2,4-diisocyanate, o-, m- and p-xylylene diisocyanates, 4,4'-diisocyanato-diphenylmethane; polyisocyanates blocked with acidic CH—, NH— or OH— compounds; and polyisocyanates containing biuret, allophanate, urethane or isocyanurate groups.

Examples of polyisocyanates of this type comprise a reaction product, containing biuret groups, of 3 moles hexamethylene diisocyanate with 1 mole water and which has an NCO content of about 22% (corresponding to the commercially available product Desmodur N ® manufactured by BAYER AG); a polyisocyanate containing isocyanurate groups which is prepared by the trimerisation of 3 moles hexamethylene diisocyanate and which has an NCO content of about 21.5% (corresponding to the commercially available product Desmodur N 3390 ® manufactured by BAYER AG); or polyisocyanates containing urethane groups, which constitute the reaction products of 3 moles toluene diisocyanate and 1 mole trimethylolpropane, with an NCO content of about 17.5% (corresponding to the commercially available product Desmodur L ® manufactured by BAYER AG). Desmodur NR and Desmodur N 3390 are preferably used.

The coating media which the rheology-influencing agents to be used according to the invention contain may contain the usual lacquer additives, in addition to the solvents which have already been mentioned. Examples of such additives include flow media based on (meth)acrylic homopolymers, silicone oils, plasticisers such as esters of phosphoric acid, phthalic acid or citric acid, anti-settling agents such as montmorillonite, pyrogenic silica, hydrogenated castor oil; hardening accelerators for the reaction of the rheology-influencing agent according to the invention with aminoplast resins or polyisocyanate resins; phosphoric acid, phosphoric acid esters, half-esters of dicarboxylic acids, citric acid; organic metal salts such as dibutyltin dilaurate, zinc naphthenate; and also compounds containing tertiary amino groups such as triethylamine.

Pigments and extenders may be used for the production of the coating media which contain the rheology-influencing agents according to the invention. The transparent or covering inorganic and/or organic colorant pigments which are usually employed in lacquers may be used. Extenders may also be used in addition.

The application of the coating media according to the invention may be effected by the usual methods, e.g. by manual spraying, automated spraying or electrostatic application (ESTA).

The coating media according to the invention possess the advantage that they result in coatings which exhibit particularly good resistance to run-off in clear lacquer and covering lacquer films, particularly during stoving processes.

The following examples serve to explain the invention.

In the examples, the efficacy of the rheology-influencing agents used according to the invention was tested by means of a run-off test which approximated to practical conditions and which is described below. In this test the wet lacquer prepared for spraying was sprayed uniformly as a block from top to bottom on to a vertical perforated sheet, and after a given aeration time was suspended in a stoving oven and hardened. Spray application was effected manually, with an automatic sprayer or using ESTA. The coating could be applied both to a blank sheet and to a lacquer coat. Run formation occurred at the edges of the holes during the application of the lacquer.

The test results were evaluated by measuring the run length (mm) at the corresponding lacquer film layer thickness ($\mu$m). There was a correlation between run length and layer thickness, the run length being superproportional to the layer thickness. Since an error was always associated with the measured pairs of values and the evaluation of a run-off characteristic for a series of tests appeared difficult, a statistical evaluation was employed in the form of a regression analysis. Using this technique, the relationship between the quantitative features of run length (L) and layer thickness (S) could be satisfactorily described by the power function: $L = f(S) = a \cdot S^b$, within the range of definition $1 \geq b > 0 \Lambda b \Sigma IR$.

Preparation of (meth)acrylic copolymers

Preparation Example 1

300 g xylene and 225 g Solvesso 100 were heated with stirring to a reflux temperature of about 147° C. in a 2 liter three-necked flask fitted with a stirrer, thermometer, condenser and dropping funnel.

A mixture of 18 g acrylic acid, 72 g styrene, 255 g hydroxypropyl methacrylate, 180 g methyl methacrylate, 330 g butyl acrylate and 45 g tert.-butyl perbenzoate was added continuously under reflux over 5 hours. The boiling point fell to 140° C. After the addition was complete, both the vessel used for the mixture and the dropping funnel were rinsed with 45 g Solvesso 100.

The batch was subsequently polymerised for 3 hours under reflux, followed by cooling to 60° C. and adjusting with 30 g Solvesso 100 to a solids content of 60%. The viscosity was 580 mPas at 25° C.

Preparation Example 2

375 g xylene and 150 g Solvesso 100 were heated with stirring to a reflux temperature of about 144° C. in a 2 liter three-necked flask fitted with a stirrer, thermometer, condenser and dropping funnel.

A mixture of 18 g acrylic acid, 72 g styrene, 110 g hydroxyethyl methacrylate, 217 g methyl methacrylate, 435 g butyl acrylate and 48 g tert.-butyl perbenzoate was added continuously under reflux over 5 hours. The boiling point fell to 136° C. After the addition was complete, both the vessel used for the mixture and the dropping funnel were rinsed with 45 g xylene. The batch was subsequently polymerised for 3 hours under reflux, followed by cooling to 60° C. and adjusting with 30 g xylene to a solids content of 60%. The viscosity was 280 mPas at 25° C.

Preparation Example 3

300 g Solvesso 100 was heated with stirring to a temperature of about 148° C. in a 2 liter three-necked flask fitted with a contact thermometer, stirrer, condenser and dropping funnel. A mixture of 105 g acrylic acid, 255 g styrene, 105 g hydroxyethyl acrylate, 210 g butyl acrylate, 360 g Cardura E10 ® and 90 g tert.-butyl perbenzoate was added continuously at 148° C. over 7 hours. After the addition was complete, both the vessel used for the mixture and the dropping funnel were rinsed with 45 g Solvesso 100. The batch was subsequently polymerised for 3 hours at 148° C. followed by cooling to 60° C. and adjusting with 30 g Solvesso 100 to a solids content of 75%. The viscosity was 4800 mPas at 25° C.

Preparation Example 4

429 g xylene and 30 g butanol were heated with stirring to a reflux temperature of about 125° C. in a 2 liter three-necked flask fitted with a stirrer, thermometer, condenser and dropping funnel.

A mixture of 27 g acrylic acid, 78 g lauryl acrylate, 96 g butyl methacrylate, 147 g butanediol monoacrylate, 148.5 g hydroxypropyl methacrylate, 420 g tert.-butyl acrylate and 58.5 g tert.-butyl perbenzoate was added continuously under reflux over 4 hours. After the addition was complete, both the vessel used for the mixture and the dropping funnel were rinsed with 45 g xylene. The batch was subsequently polymerised for 4 hours under reflux, followed by cooling to 60° C. and adjusting with 21 g xylene to a solids content of 65%. The viscosity was 940 mPas at 25° C.

Preparation of polyester resins

Preparation Example 5

383.0 g 1,6-hexanediol and 108.9 g trimethylolpropane were introduced into a 2 liter three-necked flask fitted with a thermometer, stirrer and condenser, and melted. 269.4 g isophthalic acid, 177.8 g adipic acid and 59.9 g phthalic anhydride were then added with stirring, heating and the introduction of inert gas. The mixture was then heated to 250° C. at a heating rate of 20° C./hour. After an acid number of about 10 had been reached, a vacuum was applied and the mixture was concentrated to give a viscosity of 700–800 mPas/25° C. (measured on a 70% solution in xylene). The mixture was then cooled to 120° C. and diluted with xylene to a solids content of 65%. The polyester had an acid number of 2.1 and a viscosity of 752 mPas/25° C.

Preparation Example 6

237.7 g neopentyl glycol, 65.4 g trimethylolpropane and 10.0 g diethylene glycol were introduced into a 2 liter three-necked flask fitted with a thermometer, stirrer and condenser, and melted. 126.5 g isophthalic acid, 144.9 g adipic acid, 85.2 g phthalic anhydride and 6.3 g maleic anhydride were then added with stirring, heating and the introduction of inert gas. The mixture was then heated to 210° C. at a heating rate of 20° C./hour. After an acid number of about 8 had been reached, the mixture was cooled to 120° C. and diluted with xylene to a solids content of 65%. The polyester had an acid number of 5.2 and a viscosity of 446 mPas/25° C.

Preparation of Microdispersions

Preparation Example 7

720 g of the (meth)acrylic copolymer from preparation example 1, 4.8 g maleic anhydride and 72 g Solvesso 100 were heated to 116° C. with stirring in a 2 liter three-necked flask fitted with a contact thermometer, stirrer, condenser and dropping funnel.

A mixture of 180 g hydroxyethyl acrylate, 38.4 g tert.-butyl acrylate, 72 g Solvesso 100 and 4.8 g tert.-butyl-peroxy-2-ethylhexanoate was added continuously at 116° C. over 2 hours. After the addition was complete, the mixture vessel and dropping funnel were rinsed with 36 g Solvesso 100.

The batch was subsequently polymerised for 2 hours at 116° C., followed by cooling to 60° C. and adjusting with 72 g Solvesso 100 to a solids content of 55%. The viscosity was 600 mPas at 25° C.

Preparation Example 8

540 g of the (meth)acrylic copolymer from preparation example 3, 4.8 g maleic anhydride and 144 g xylene were heated to 118° C. with stirring in a 2 liter three-necked flask fitted with a contact thermometer, stirrer, condenser and dropping funnel.

A mixture of 198 g hydroxyethyl acrylate, 48 g tert.-butyl acrylate, 92.4 g xylene, 3.6 g tert.-butyl-peroxy-2-ethylhexanoate and 1.2 g tert.-butyl perbenzoate was added continuously at 118° C. over 2.5 hours. After the addition was complete, the mixture vessel and dropping funnel were rinsed with 48 g xylene.

The batch was subsequently polymerised for 3 hours at 118° C., followed by cooling to 60° C. and adjusting with 120 g xylene to a solids content of 55%. The viscosity was 820 mPas at 25° C.

Preparation Example 9

739.2 g of the polyester resin from preparation example 6, 9 g maleic anhydride, 24 g butyl acetate and 40.8 g xylene were heated to 116° C. with stirring in a 2 liter three-necked flask fitted with a contact thermometer, stirrer, condenser and dropping funnel.

A mixture of 285.6 g hydroxyethyl acrylate, 36 g butyl acetate and 4.8 g tert.-butyl-peroxy-2-ethylhexanoate was added continuously at 116° C. over 2.5 hours. After the addition was complete, the mixture vessel and dropping funnel were rinsed with 30 g butyl acetate. 0.6 g Trigonox 21 was added 15 minutes after the addition was completed.

The batch was subsequently polymerised for 2 hours at 116° C., followed by cooling to 60° C. and adjusting with 30 g butyl acetate to a solids content of 65%. The viscosity was 550 mPas at 25° C.

Preparation of rheology-influencing agents

EXAMPLE 1

324 g of the (meth)acrylic copolymer from preparation example 1, 240 g of the microdispersion from preparation example 7 and 144 g Solvesso 100 were placed in a 2 liter three-necked flask and heated to 30° C. on a water bath, with stirring.

32.4 g toluene diisocyanate were added, and the reaction was allowed to proceed until an NCO content of 1.1% was obtained (about 90 minutes). A mixture of 180 g xylene, 174 g of the (meth)acrylic copolymer from preparation example 1, 18 g octylamine and 3.3 g butanol was added continuously over 3 hours. After the addition was complete, the mixture vessel and dropping funnel were rinsed with 42 g xylene.

The batch was subsequently reacted for 2 hours and adjusted with 42 g butanol to a solids content of 40%. The viscosity (after standing overnight) was strongly thixotropic.

EXAMPLE 2

324 g of the (meth)acrylic copolymer from preparation example 2,234 g of the microdispersion from preparation example 8 and 156 g xylene were placed in a 2 liter three-necked flask and heated to 30° C. on a water bath, with stirring.

32.4 g toluene diisocyanate were added, and the reaction was allowed to proceed until an NCO content of 1.1% was obtained (about 100 minutes). A mixture of 180 g xylene, 168 g of the (meth)acrylic copolymer from preparation example 4 and 18 g octylamine was added continuously over 3 hours.

After the addition was complete, the mixture vessel and dropping funnel were rinsed with 42 g xylene.

The batch was subsequently reacted for 2 hours and adjusted with 45.6 g butanol to a solids content of 40%. The viscosity (after standing overnight) was strongly thixotropic.

EXAMPLE 3

396 g of the polyester resin from preparation example 5, 198 g of the microdispersion from preparation example 4 and 102 g Solvesso 100 were placed in a 2 liter three-necked flask and heated to 30° C. on a water bath, with stirring.

32.4 g toluene diisocyanate were added, and the reaction was allowed to proceed until an NCO content of 1.1% was obtained (about 110 minutes).

A mixture of 192 g Solvesso 100, 6 g butanol, 174 g of the polyester resin from preparation example 5 and 18 g octylamine was added continuously over 3 hours. After the addition was complete, the mixture vessel and dropping funnel were rinsed with 36 g butyl acetate.

The batch was subsequently reacted for 2 hours and adjusted with 45.6 g Solvesso 100 to a solids content of 48%. The viscosity (after standing overnight) was strongly thixotropic.

Preparation of lacquers

EXAMPLE 4

(clear lacquer with the rheology-influencing agent from example 2)

53.8 parts by weight of a low molecular weight, hydroxyfunctional (meth)acrylic copolymer with a styrene content of 21%, an OH number of 80 mg KOH/g, an acid number of 20.5 and a viscosity of 310 mPas/25° C. in the form of a 60 % solution in xylene, was mixed with 30.6 parts by weight of a commercially available melamine resin (SETAMINE US-138/70 ®) and 37.5 parts by weight of the rheology-influencing agent from Example 2. The mixture was adjusted to a processing consistency of 30 sec. AK4/20° C. with 18.0 parts by weight of a solvent mixture comprising Solvesso 100:n-butanol=4:1, and applied to perforated metal sheets.

Comparative example A (clear lacquer without rheology-influencing agent)

53.8 parts by weight of a low molecular weight, hydroxyfunctional (meth)acrylic copolymer with a styrene content of 21%, an OH number of 80 mg KOH/g, an acid number of 20.5 and a viscosity of 310 mPas/25° C. in the form of a 60% solution in xylene, was mixed with 39.9 parts by weight of SETAMINE US-138/70 ®. The mixture was adjusted to a processing consistency of 30 sec. AK4/20° C. with 27.0 parts by weight of a solvent mixture comprising Solvesso 100:n-butanol=4:1, and applied to perforated metal sheets (AK4=discharge consistency for a 4 mm nozzle).

EXAMPLE 5

(white lacquer with the rheology-influencing agent from Example 2)

53.8 parts by weight of a low molecular weight, hydroxyfunctional (meth)acrylic copolymer with a styrene content of 21%, an OH number of 80 mg KOH/g, an acid number of 20.5 and a viscosity of 310 mPas/25° C., in the form of a 60% solution in xylene, was mixed with 34.0 parts by weight of titanium dioxide and milled to a milled fineness of about 10 μm using a dissolver. 30.6 parts by weight SETAMINE US-138/70 ® and 37.5 parts by weight of the rheology-influencing agent from Example 2 were then added and mixed. The mixture was adjusted to a processing consistency of 30 sec. AK4/20° C. with 30.0 parts by weight of a solvent mixture comprising Solvesso 100:n-butanol=4:1, and applied to perforated metal sheets.

Comparative example B (white lacquer without rheology-influencing agent)

53.8 parts by weight of a low molecular weight, hydroxyfunctional (meth)acrylic copolymer with a styrene content of 21%, an OH number of 80 mg KOH/g, an acid number g 20.5 and a viscosity of 310 mPas/25° C. in the form of a 60% solution in xylene, was mixed with 34.0 parts by weight of titanium dioxide and milled to a milled fineness of about 10 μm using a dissolver. 39.9 parts by weight SETAMINE US-138/70 ® was then added. The mixture was adjusted to a processing consistency of 30 sec. AK4/20° C. with 28.0 parts by weight of a solvent mixture comprising Solvesso 100:n-butanol=4:1, and applied to perforated metal sheets.

EXAMPLE 6

(2K clear lacquer with the rheology-influencing agent from Example 2)

1.0 parts by weight of a light stabiliser of the benzotriazole type and 1.0 parts by weight of a light stabiliser of the HALS type were dissolved in 82.0 parts by weight of a hydroxyfunctional styrene-free (meth)acrylic copolymer with an OH number of 140 mg KOH/g and an acid number of 27.6 mg KOH/g, as a 50% solution in Solvesso 100:methoxypropyl acetate:butyl acetate:xylene=32:6:6:6. 1.5 parts by weight of a 10% solution of silicone oil in xylene, 5.0 parts by weight butyl diglycol acetate, 50.0 parts by weight of the rheology-influencing agent from example 2 and 9.5 parts by weight Solvesso 100 were added to the above mixture and mixed well.

12.0 parts by weight of a hardener solution comprising 84.6 parts by weight of Desmodur N 3390 ® (BAYER AG), 7.7 parts by weight butyl acetate and 7.7 parts by weight Solvesso 100 were added to 60.0 parts by weight of the stock lacquer described above. The preparation was mixed well and applied to perforated metal sheets.

Comparative example C (2K clear lacquer without rheology-influencing agent)

1.0 parts by weight of a light stabiliser of the benzotriazole type and 1.0 parts by weight of a light stabiliser of the HALS type were dissolved in 82.0 parts by weight of a hydroxyfunctional styrene-free (meth)acrylic copolymer with an OH number of 140 mg KOH/g and an acid number of 27.6 mg KOH/g, as a 50% solution in Solvesso 100:methoxypropyl acetate:butyl acetate:xylene=32:6:6:6. 1.5 parts by weight of a 10% solution of silicone oil in xylene, 5.0 parts by weight butyl diglycol acetate and 9.5 parts by weight Solvesso 100 were added to the above mixture and mixed well.

12.0 parts by weight of a hardener solution comprising 84.6 parts by weight of Desmodur N 3390 ® (BAYER AG), 7.7 parts by weight butyl acetate and 7.7 parts by weight Solvesso 100 were added to 40.0 parts by weight of the stock lacquer described above. The preparation was mixed well and applied to perforated metal sheets.

Example 7 (2K clear lacquer with the rheology-influencing agent from Example 3)

60.0 parts by weight of the hydroxyfunctional polyester from preparation example 5 were well mixed with 10.0 parts by weight of the rheology-influencing agent from example 3. A solution comprising 2.0 parts by weight butyl acetate, 10.0 parts by weight methoxypropyl acetate, 4.0 parts by weight ethoxypropyl acetate, 1.2 parts by weight of a light stabiliser of the benzotriazole type and 1.2 parts by weight of a light stabiliser of the HALS type was then prepared and mixed with the stock component. 1.6 parts by weight of a 10% solution of silicone oil in xylene and 4.0 parts by weight ethoxypropyl acetate were then added.

25.0 parts by weight of a hardener solution comprising 75.0 parts by weight Desmodur N/75 MX ®, 12.5 parts by weight methoxypropyl acetate and 12.5 parts by weight xylene were added to 75.0 parts by weight of the stock lacquer described above, mixed well and applied to perforated metal sheets.

Comparative example D (2K clear lacquer without rheology-influencing agent)

A solution comprising 2.0 parts by weight butyl acetate, 10.0 parts by weight methoxypropyl acetate, 4.0 parts by weight ethoxypropyl acetate, 1.2 parts by weight of a light stabiliser of the benzotriazole type, 1.2 parts by weight of a light stabiliser of the HALS type, 1.6 parts by weight of a 10% solution of silicone oil in xylene and 4.0 parts by weight ethoxypropyl acetate was added to 70.0 parts by weight of the hydroxyfunctional polyester from preparation example 5.

25.0 parts by weight of a hardener solution comprising 75.0 parts by weight Desmodur N/75 MX®, 12.5 parts by weight methoxypropyl acetate and 12.5 parts by weight xylene were added to 75.0 parts by weight of the stock lacquer described above, mixed well and applied to perforated metal sheets.

EXAMPLE 8

(clear lacquer with the rheology-influencing agent from Example 1)

58.3 parts by weight of a low molecular weight, hydroxyfunctional styrene-free (meth)acrylic copolymer with an OH number of 120 mg KOH/g, an acid number of 26.9 and a viscosity of 890 mPas/25° C. in the form of a 65% solution in xylene:n-butanol=33:2, was mixed with 30.6 parts by weight of SETAMINE US-138/70® and 37.5 parts by weight of the rheology-influencing agent from Example 1. The mixture was adjusted to a processing consistency of 30 sec. AK4/20° C. with a solvent mixture comprising Solvesso 100:n-butanol=4:1, and applied to perforated metal sheets.

Comparative example E (clear lacquer without rheology-influencing agent )

53.8 parts by weight of a low molecular weight, hydroxyfunctional styrene-free (meth)acrylic copolymer with an OH number of 120 mg KOH/g, an acid number of 26.9 and a viscosity of 890 mPas/25° C., in the form of a 65% solution in xylene:n-butanol=33:2, was mixed with 30.6 parts by weight of SETAMINE US-138/70®. The mixture was adjusted to a processing consistency of 30 sec. AK4/20° C. with a solvent mixture comprising Solvesso 100:n-butanol=4:1, and applied to perforated metal sheets.

DESCRIPTION OF DRAWINGS

FIGS. 1–5 are plots of layer thickness against length for examples 4–8 and comparative tests A–E, respectively.

Figure 5:
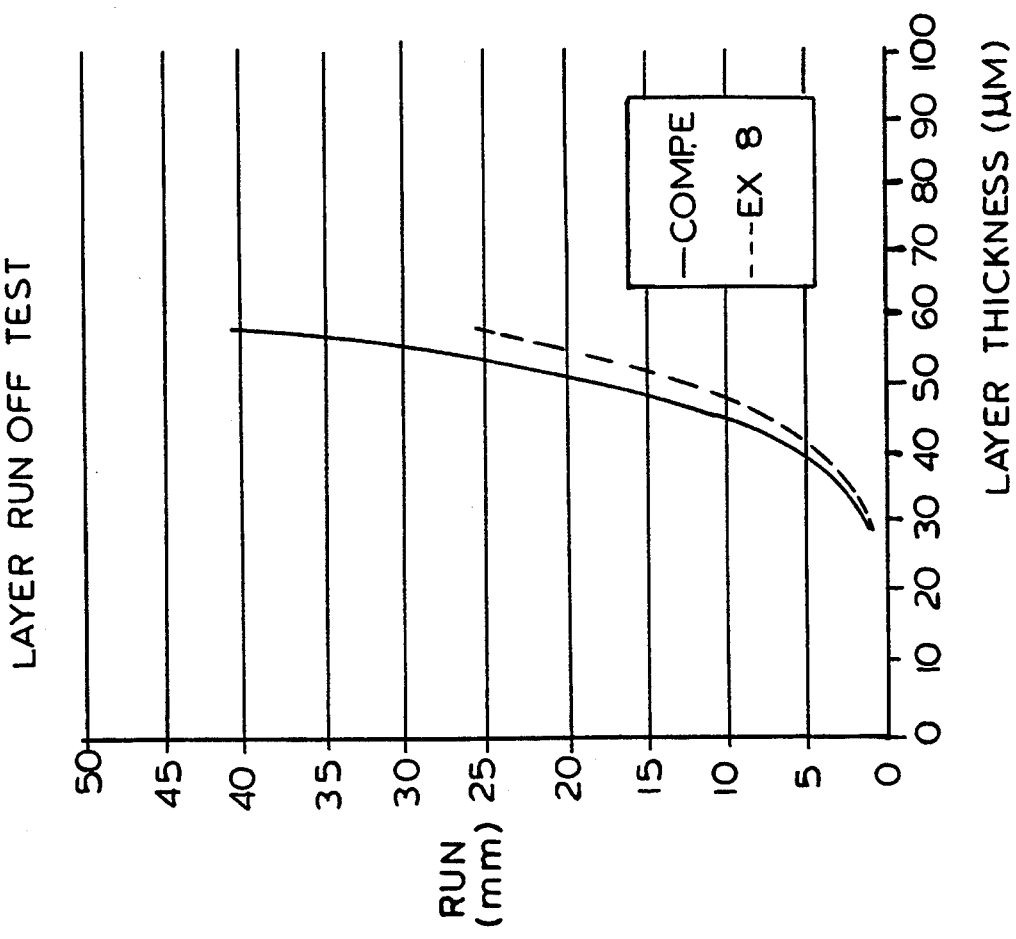

The lacquers from examples 4 to 8, and from the corresponding comparative tests A) to E), were subjected to the aforementioned run-off test. The results are shown in the accompanying FIGS. 1 to 5. The layer thickness of the films obtained is plotted against the length of the undesired run in these Figures. It can be seen that run formation is strongly repressed by means of the rheology-influencing agents according to the invention. It was shown that the optical properties (gloss and brilliance) of the lacquer were not impaired by the rheology-influencing agents according to the invention.

We claim:

1. A composition suitable as a rheology-influencing agent for coating media, containing a mixture which is obtainable by the preparation of A) one or more (meth)acrylic copolymers containing hydroxyl groups and/or one or more polyesters containing hydroxyl groups, with a hydroxyl number of 30–200 mg KOH/g and a carboxyl group content corresponding to an acid number of 0–50 mg KOH/g, and B) a hydroxyfunctional microdispersion obtainable by preparing a solution of one or more film-forming polyesters containing hydroxyl and/or carboxyl groups and/or (meth)acrylic copolymers containing hydroxyl and/or carboxyl groups, wherein 0–50% of the polyester and/or (meth)acrylic copolymer molecules are each esterified with one molecule of maleic acid or maleic anhydride, and optionally copolymerizing one or more hydroxyalkyl (meth)acrylate monomers polymerizable by free radicals in the mixture with one or more other unsaturated monomers, and reaction of the mixture of A) and B) with C) one or more diisocyanates and D) one or more aliphatic primary monoamines which may be present in the mixture with part of component A) or of the soluble fraction of component B), wherein the amount of (meth)acrylic copolymers and/or polyesters contained in components A), B) and D) is 57 to 90 weight %, the amount of microparticles contained in B) is 5 to 30 weight %, the amount of diisocyantes C) is 3 to 8 weight %, and the amount of monoamines D) is 2 to 5 weight %, wherein the weight percentages are in each case based on the solids content and add up to 100 weight %, and the composition may in addition contain pigments, extenders, the usual lacquer additives and/or solvents.

2. A coating medium containing a composition according to claim 1 as a rheology-influencing agent, and one or more hydroxyfunctional vehicles in addition to one or more crosslinking agents, and optionally one or more pigments, extenders, the usual lacquer additives and/or solvents.

3. A composition and coating medium according to claim 1, wherein component B) is obtainable by preparing a solution of a) 15–85 weight % of one or more film-forming polyesters containing hydroxyl and/or carboxyl groups and/or (meth)acrylic copolymers containing hydroxyl and/or carboxyl groups, wherein up to half of the polyester and/or (meth)acrylic copolymer molecules can each be esterified with one molecule of maleic acid, and the polymerisation in this preparation of b) 15–85 weight % of one or more radically polymerisable monomers based on one or more hydroxyalkyl (meth)acrylates and one or more other unsaturated monomers.

4. A composition and coating medium according to claim 3 wherein the radically polymerisable monomers of component B) are a mixture of b1) 80–100 weight % of one or more hydroxyalkyl (meth) acrylates and b2) 0–20 weight % of one or more other unsaturated monomers.

5. A composition and coating medium according to one of claim 3, wherein component a) completely or partially corresponds to component A).

6. A composition and coating medium according to claim 1, wherein one or more (meth)acrylic copolymers, with an acid number of 1–50 mg KOH/g, a hydroxyl number of 30–200 mg KOH/g, a number average molecular weight of 1500–30,000 and a glass transition temperature of −20° C. to +80° C., are used as component A.

7. A composition and coating medium according to claim 1, wherein one or more polyesters, with an acid number of 1–50 mg KOH/g, a hydroxyl number of 30–200 mg KOH/g and a number average molecular weight of 1000–6000, are used as component A.

8. A composition and coating medium according to claim 1, wherein a microdispersion with a high content of hydroxyl groups is used as component B, in which the microparticles have a hydroxyl number of at least 300 mg KOH/g, an acid number of 1–50 mg KOH/g, and a particle size of 50–800 nm.

9. A composition and coating medium according to claim 1, wherein an aromatic diisocyanate, particularly toluene 2,4- and/or 2,6-diisocyanate, is used as component C.

10. A composition and coating medium according to claim 1, wherein a aliphatic primary monoamine with 4–18 carbon atoms in the molecule, particularly with $C_8$–$C_{12}$ carbon atoms in the molecule, is used as component D.

11. A method of preparing a composition according to claim 1, characterised in that a solution is prepared of
 a) 15–85 weight % of one or more film-forming polyesters containing hydroxyl and/or carboxyl groups and/or (meth)acrylic copolymers containing hydroxyl and/or carboxyl groups, wherein up to half of the polyester and/or (meth)acrylic copolymer molecules can each be esterified with one molecule of maleic acid, and in this preparation
 b) 15–85 weight % of one or more radically polymerisable monomers based on one or more hydroxyalkyl (meth)acrylates, which may be present in the mixture with one or more other unsaturated monomers, is polymerised with the formation of a hydroxyfunctional microdispersion B, and that the hydroxyfunctional microdispersion thus obtained (component B) is mixed with a proportion of one or more (meth)acrylic copolymers containing hydroxyl groups and/or one or more polyesters containing hydroxyl groups with a hydroxyl number of 30–200 mg KOH/g and a carboxyl group content corresponding to an acid number of 0–50 mg KOH/g as component A, that the amount of (meth)acrylic copolymers and/or polyesters contained in components A), B) and D) corresponds to 57 to 90 weight % and the amount of microparticles contained in B) corresponds to 5 to 30 weight %, and the mixture thus obtained is reacted with
 3–8 weight % of one or more diisocyanates (component C) and
 2–5 weight % of one or more aliphatic primary monoamines (component D), optionally in admixture with part of component A) or of the soluble fraction of component B,
wherein the weight percentages are based in each case on the solids content and the sum of components A, B, C and D, and the sum of components a) and b), amounts to 100 weight % in each case.

12. A method according to claim 11, characterised in that a mixture of
 b1) 80–100 weight % of one or more hydroxyalkyl meth)acrylates and
 b2) 0–20 weight % of one or more other unsaturated monomers is used as component b).

13. A method according to claim 11, characterised in that one or more (meth)acrylic copolymers containing hydroxyl groups and/or one or more polyesters containing hydroxyl groups, as used for component A), are used or are used in addition for the preparation of component a).

14. A method of producing a coating medium according to claim 2, characterised in that a composition, prepared by the method according to any one of claims 11 to 13, is mixed with one or more hydroxyfunctional vehicles, with one or more crosslinking agents, and optionally with one or more pigments, extenders, and the usual lacquer additives and/or solvents.

15. A method according to claim 14, characterised in that coating media are produced which contain 5–60 weight % of the composition prepared by the method according to any one of claims 11 to 13.

* * * * *